United States Patent [19]

Laakmann

[11] Patent Number: 4,652,083

[45] Date of Patent: Mar. 24, 1987

[54] HOLLOW WAVEGUIDE

[75] Inventor: Katherine D. Laakmann, Laguna Niguel, Calif.

[73] Assignee: Laakmann Electro-Optics, Inc., San Jaun Capistrano, Calif.

[21] Appl. No.: 713,149

[22] Filed: Mar. 18, 1985

[51] Int. Cl.[4] .............................................. G02B 6/20
[52] U.S. Cl. ............................. 350/96.32; 350/96.34
[58] Field of Search ............... 350/96.10, 96.29, 96.30, 350/96.32, 96.34

[56] References Cited

U.S. PATENT DOCUMENTS 3,436,141  4/1969  Comte .............................. 350/96.32

OTHER PUBLICATIONS

Losses and Phase Constant Changes Caused by Bends in the General Class of Hollow Waveguides for the Infrared—Migayi et al., *Applied Optics*, Dec. 15, 1981, vol. 20, No. 24, pp. 4221-4226.
Wave Propagation and Attenuation in the General Class of Circular Hollow Waveguides with Uniform Curvature—Miyagi, et al., *Transactions of the IEEE*, vol. MTT-32, No. 5, May 1984, pp. 513-521.
Optical Waveguides and Fiber Sensors—Miyagi, et al., *Technical Digest of Papers*, CLEO '83, pp. 210-211.
Theory of Bragg Fiber*—Yeh, et al., *J. Opt. Soc. Am.*, vol. 68, No. 9, Sep. 1978, pp. 1196-1201.
Transmission Characteristics of a Dielectric-Tube Waveguide with an Outer Higher-Index Cladding—Miyagi, et al., *Electronics Letters*, May 12, 1977, vol. 13, No. 10, pp. 274-275.
Design Theory of Dielectric-Coated Circular Metallic Waveguides for Infrared Transmission—Miyagi, et al., *Journal of Lightwave Technology*, vol. LT-2, No. 2, Apr. 1984, pp. 116-126.
Transmission Characteristics of Dielectric-Coated Metallic Waveguide for Infrared Transmission: Slab Waveguide Model—Migayi, et al., *IEEE Journal of Quantum Electronics*, vol. QE-19, No. 2, Feb. 1983, pp. 136-145.
Fabrication of Germanium-Coated Nickel Hollow Waveguides for Infrared Transmission—Migayi, et al., *Appl. Phys. Lett.* 43 (5) Sep. 1, 1983, pp. 430-432.
Waveguide Loss Evaluation by the Ray-Optics Method—Miyagi, et al., *J. Opt. Soc. Am.*, vol. 73, No. 4, Apr. 1983, pp. 486-489.
Low-Loss Optical Transmission through Bent Hollow Metal Waveguides—Garmire, et al., *Applied Physics Letters*, vol. 31, No. 2, Jul. 15, 1977, pp. 92-94.
Transverse Electrodeless RF Discharge Excitation of High-Pressure Laser Gas Mixtures—Christensen, et al., *IEEE Journal of Quantum Electronics*, vol. QE-16, No. 9, Sep. 1980, pp. 949-954.
High-Repetition Rate 10-atm rf-Excited $CO_2$ Waveguide Laser—Lovold, et al., *Technical Digest of Papers*, p. 88.
High-Power Military $CO_2$ Waveguide Laser—Whitebrook, et al., *Technical Digest of Papers*, p. 146.
A Transversely rf-Excited $CO_2$ Waveguide Laser—Lachambre, et al., *Appl. Phys. Lett.*, vol. 32, No. 10, May 15, 1978, pp. 652-653.
Compact $CO_2$ Laser with Transverse rf Excitation—H. Hugel et al., *Technical Digest of Papers*, pp. 90-91.
Waveguides for High Power $CO_2$ Lasers—T. McMahon, et al., *Society of Manufacturing Engineers Technical Paper*, MR76-869.
Fiber and Integrated Optics: Waveguides in the Infrared—E. Garmire, *Optical Spectra*, Apr. 1979, pp. 50-54.

*Primary Examiner*—William L. Sikes
*Assistant Examiner*—Frank González
*Attorney, Agent, or Firm*—Audley A. Ciamporcero, Jr.

[57] ABSTRACT

A flexible hollow waveguide has an optically smooth, rectangular cross section internal channel, in which reflecting metal is overcoated with a $ThF_4$ or ZnSe dielectric approximately one-half of the quarter wave thickness. $CO_2$ laser propagation is promoted for guide curvatures down to about 5 cm radius of curvature.

5 Claims, 6 Drawing Figures

U.S. Patent   Mar. 24, 1987   Sheet 2 of 2   4,652,083
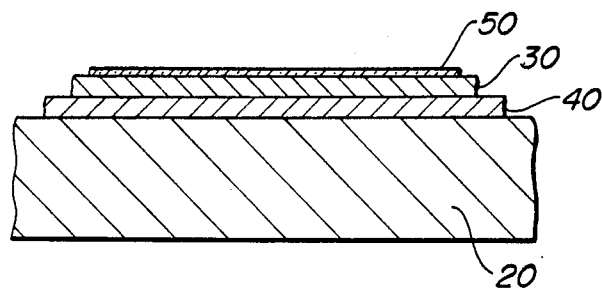
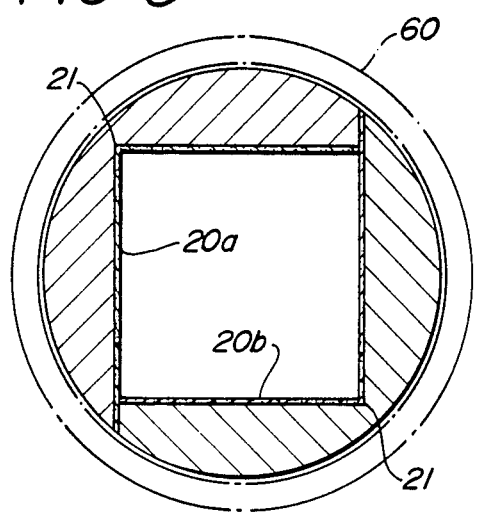
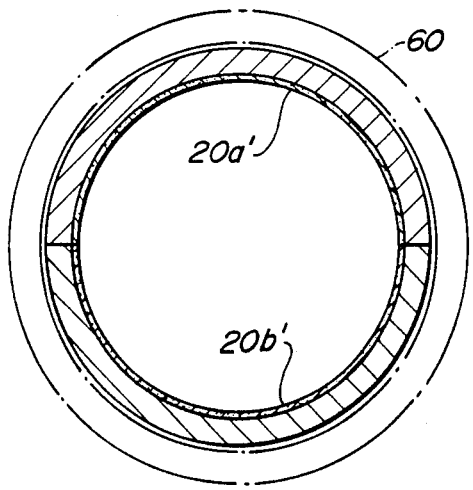

HOLLOW WAVEGUIDE

TECHNICAL FIELD

This invention relates generally to flexible, narrow diameter, hollow waveguides and, in particular, to those capable of high efficiency transmission of $CO_2$ laser energy suitable for medical applications.

CROSS REFERENCE TO RELATED APPLICATIONS

Reference is made to concurrently filed, commonly assigned patent applications, both of K. D. Laakman, respectively entitled "Hollow Waveguide Having Plural Layer Dielectric" U.S. Ser. No. 713,150, and "Hollow Waveguides Having Disparate Dielectric Overcoatings" U.S. Ser. No. 713,151.

BACKGROUND OF THE INVENTION

For almost as long as $CO_2$ lasers have been viable tools for medical applications, the search has been on for improved modes of guiding the laser beam to the desired operating area. For the most part, lasers have been coupled with multi-section articulated arms having any number of large bore tubular sections hinged together with a reflective surface at each hinge to permit the laser light to traverse the length of the arm and to be aimed toward the desired site.

While such articulated arm laser systems have experienced wide spread acceptance lately in a variety of medical specialities, they are generally somewhat clumsy to use since the arm typically offers some "resistance" to movement by the surgeon. Such arms are inherently limited in the scope of their medical applications, because of their size and limited flexibility. Present $CO_2$ surgical applications are essentially limited to those in which there is direct access to the area to be treated. $CO_2$ endoscope procedures are still rare, as the present technology requires a relatively wide, but short and straight endoscopic channel to "shoot" the $CO_2$ beam down. In addition, most articulated arms experience problems with beam alignment particularly if the surgical application calls for a small spot size. These arms also tend to be expensive, especially if precision optical alignment is required.

It is an object of the present invention to provide a small diameter, flexible fiber for carrying $CO_2$ laser emissions, which can be threaded down a longer, narrow or flexible endoscope, or alternatively be used as a second puncture probe.

A variety of optical fibers have been proposed as the transmission medium for laser energy, but to date, not a single one has become commercially accepted for the 10.6 micron wavelength which is characteristic of $CO_2$ lasers. Optical fibers or light pipes for the transmission of infrared light at 10.6 microns have however been proposed: in one instance a polycrystalline fiber, such as the KRS-5 fiber developed by Horiba, Ltd. of Japan; and in another, a flexible, hollow waveguide, various versions of which have been suggested by among others E. Garmire and M. Miyagi. See, for instance, M. Miyagi, et al., "Transmission Characteristics of Dielectric-Coated Metallic Waveguide for Infrared Transmission: Slab Waveguide Model", IEEE *Journal of Quantum Electronics,* Volume QE-19, No. 2, February 1983, and references cited therein. Recently, Miyagi, et al. suggested fabricating a dielectric-coating metallic hollow, flexible waveguide for IR transmission using a circular nickel waveguide with an inner germanium layer applied by rf-sputtering, plating and etching techniques. Miyagi, et al. predict extremely small transmission losses for a straight guide, but in fact, actual transmission degrades substantially with but nominal bending radii (20 cm). To understand this, the mechanism of transmission must be considered.

Transmission of laser light through a flexible, narrow diameter hollow waveguide is subject to losses largely due to successive reflections of the beam along the interior surface of the curved guide. For the size and curvatures contemplated for a medical fiber, rays will intersect the wall at angles of incidence ranging from, typically, 80° to 90°. Bending a hollow fiber increases the loss as it tends to increase the number of internal reflections and decrease the angle of incidence. In general, as the angle of incidence decreases from 90° to 80°, the loss per reflection bounce increases. It is an object of the present invention, therefore, to provide a coating which has high reflectivity over angles of incidence ranging from 80° to 90°.

A difficulty of curving metal walls is that at these angles of incidence, metals tend to exhibit high reflectivity for only the S polarization but low reflectivity (<96%) for the P polarization. The losses for a 1 meter curved guide are of the order 10 dB. Garmire et al. attempted to avoid this problem by using a metal/dielectric guide in which the guide was oriented relative to the incoming beam such that the metal walls "saw" only the P polarization. This approach is flawed, however, because the dielectric walls show high reflectivity for only very, very high angles of incidence, typically in excess of 89°-requiring, in essence, that the guide must be straight along the direction of the dielectric.

Some have suggested remedying this situation by overcoating a reflecting surface with a quarter-wave dielectric coating. Such a coating will yield high reflectivity for the P polarization, but low for the S polarization. Miyagi et al. attempt to strike a compromise by choosing a coating of thickness somewhere between those favoring the P and those favoring the S polarization. He chose a germanium coating of approxiamately 0.4 to 5 micrometers in thickness. This coating yielded relatively good results (>90%/meter transmission) for straight guides, but rather poor for bent guides.

This disparity appears to result from two factors: (1) The transmission with the $He_{11}$ mode in a straight guide correlates poorly with the transmission of very high multi order modes in a bent guide; and (2) The imaginary part of the refractive index of the dielectric coating is extremely crucial in the transmission of a bent guide.

It is an object of the present invention to provide dielectric overcoated waveguides which are tuned to perform well although bent in compound curvature.

SUMMARY OF THE INVENTION

We have invented a flexible, narrow outer diameter, metal coated dielectric-overcoated hollow waveguide capable of transmitting in excess of 68% of the entering $CO_2$ laser energy over a one meter section even when subjected to compound curvatures. The waveguide is sufficiently thin to be passed down the esophagus of an adult patient and is safe for endoscopic applications.

The principles of the present invention are premised on dealing with refractivity as a complex (i.e., real plus imaginary) quantity, taking into account both P and S polarizations over a designated range of angles of presentation. In accordance with the principles of the present invention, a flexible, narrow diameter, hollow waveguide has an outer reflective structure coated on its inner walls with suitable dielectric material of thickness equal to about one eighth the wavelength of the light to be transmitted by the waveguide. Such a dielectric construction will, on average, have relatively minimal adverse effect (i.e., loss) for both P and S polarizations, because the extinction coefficient of the complex index of refraction will have been reduced substantially over the quarter wave thickness shown in the prior art. For example, thorium fluoride (ThF$_4$) and zinc selenide (ZnSe) are suitable dielectric materials useful in preferred embodiments for transmission of CO$_2$ laser emissions. In such preferred embodiments, silver is an appropriate reflecting outer layer, and the dielectric thickness may be within about ±20% of an eighth wavelength in thickness, and the refractive index n is less than about 2.6.

The materials of the waveguide walls are chosen for (1) ability to obtain/retain the requisite inner wall flatness, smoothness, and dimensional control; (2) flexibility; (3) utilization of low loss dielectric overcoatings; and (4) coating adhesiveness. The inner wall is coated with a high reflectivity metal and then overcoated with a dielectric overcoat.

In a preferred embodiment, a light pipe comprises two generally V-shaped aluminum rods joined to form a guide having a square interior cross-section, and interior surfaces coated first with chromium for adhesiveness, then with silver, and then with a thin film dielectric coating of either thorium fluoride, ThF$_4$, or zinc selenide, ZnSe, of thickness of about 0.5±0.2 of ⅛ $\lambda_m$ of the laser light in the dielectric. In such an arrangement, the reflectivities of both the P and the S polarizations of the laser light averaged together are greater than 99.0% for any incident angle in the range of 80° to 90°.

BRIEF DESCRIPTION OF THE DRAWINGS

FIG. 4 is an enlarged section taken along line 4—4 of FIG. 3;

FIG. 5 is a view similar to FIG. 3 representing an alternative embodiment of the waveguide; and FIG. 6 is a view similar to FIG. 3 showing another alternative embodiment of the waveguide.

DETAILED DESCRIPTION OF THE PREFERRED EMBODIMENTS INCLUDING THE BEST MODE FOR CARRYING OUT THE INVENTION

In general, for a guide to be useful for medical including endoscopic applications, the average reflectivity of P and S polarizations combined must be greater than 97% and preferably greater than 99% for both P and S polarizations for all angles of incidence from about 80° to about 90°. The reason for requiring a high reflectivity condition over such a broad range of angles is that a curved guide in effect introduces lower angles of incidence as the beam is propagated through the guide. The extreme angle of incidence $\phi$ that needs to be considered in a curved guide of inner cross section d and radius of curvature R is given by the relationship:

$$\phi = \cos^{-1}\sqrt{2d/R}$$

Hence, for a guide with d=1 mm and R=10 cm, the extreme incident angle is 82°. A waveguide in actual medical use will have, of course, a non-uniform radius of curvature introducing in effect even smaller incident angles. However, for a waveguide with an inner cross section diameter on the order of 1 mm the angles of incidence will normally be in the 80° to 90° range.

Figure 1:
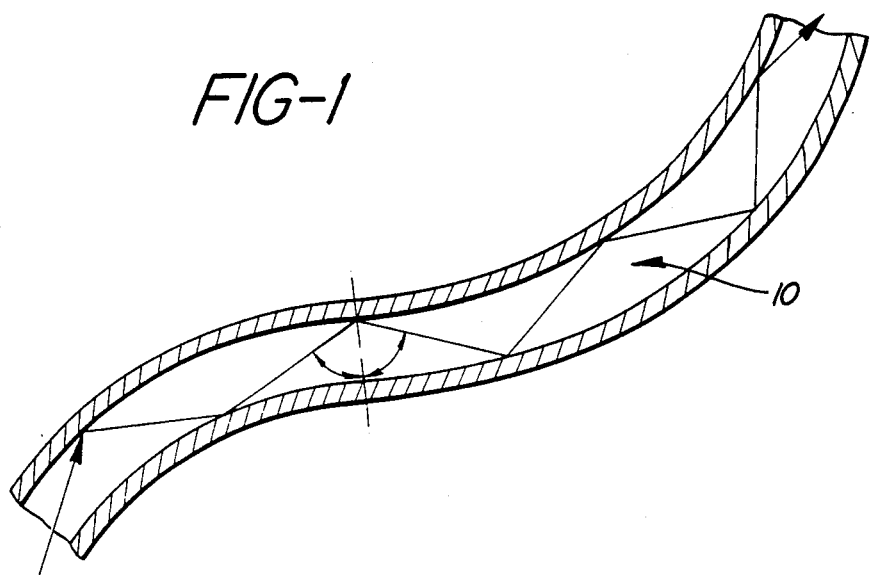
FIG. 1 is a diagrammatic representation of a section of a curved light pipe illustrating schematically the multiple reflections to which a coherent lightwave is subjected while travelling through the light pipe.
Figure 2:
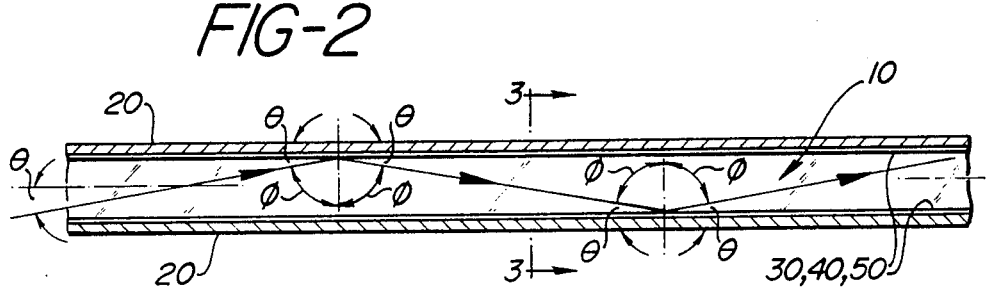
FIG. 2 is a straight section of a portion of a hollow metal waveguide according to the present invention.

In practice, a portion of the waveguide will have compound curvatures such as shown in the diagrammatic illustration of FIG. 1 wherein the laser beam, modeled in FIGS. 1 and 2 as a one dimensional ray, enters the waveguide in a direction normal to a plane orthogonally intersecting the waveguide at one end of the guide. The beam is then reflected off the interior surface of the waveguide at intervals determined by the curvature of the guide. For the types of guides under consideration, i.e., those having an inner diameter of about 1 mm and curvatures of 30 cm or less, a typical ray will hit the interior wall about every 1 to 2 cm. Hence, for a one meter length of the guide there will be about 75 reflections or bounces. Assuming an average energy loss of 0.5% per bounce, a one meter guide will transmit 68% of the light entering the guide. With just a half percent increase in loss per bounce to 1%, the overall transmission falls to about 47%.

For purposes of this application, "transmission rating" shall describe the percentage of CO$_2$ laser energy transmitted by a one meter section of a curved guide. Thus, a 68% transmission rating represents a one meter section of a guide that transmits at least 68% of the energy of a propagating CO$_2$ laser beam entering the guide after the beam is subjected to up to 75 internal reflections.

Figure 3:
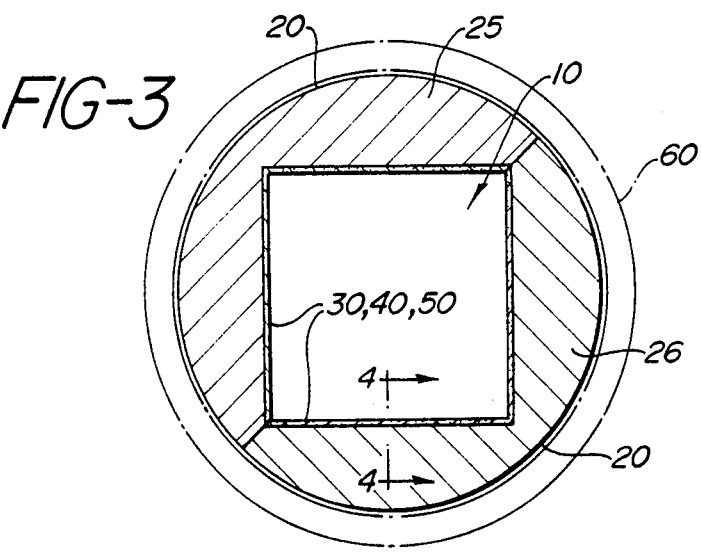
FIG. 3 is a section taken along line 3—3 of FIG. 2.

With reference to FIGS. 2, 3, and 4 there is shown a straight line section of a flexible hollow waveguide referred to generally as 10. The waveguide includes tube 20 of a material, preferably stainless steel or aluminum, chosen on the basis of mechanical performance including ductility and strength hygroscopicity. An additional requirement of the material forming the guide (i.e., halves 25 and 26 in FIG. 3) is that it be easily coatable, for example, in a vacuum chamber by an adhesive material, to yield a low loss surface. Plastics, from a mechanical viewpoint, may be preferable material for tube 20; however, it is more difficult to obtain low loss coatings because of the limited temperature to which plastics may be heated.

Enclosed within the tube 20 are opposing halves 26 of a base material adapted to receive a reflective and dielectric coatings pursuant to the present invention. Preferably, the halves 25 and 26 are each formed from a metallic wire and machined with a triangular (i.e., half square) groove therein, as shown. When the halves are mated within the tube 20, the square hollow waveguide is formed. The inner walls of the halves 25 and 26 must also be optically smooth, relative to grazing incidence at 10.6 $\mu$m. Onto the interior surface of tube halves 25 and 26, a metal coating 30 is applied. Coating 30 must be a high normal incidence reflector of light at a wavelength of 10.6 microns, such as silver. Other suitable metal coatings include gold and aluminum. The thickness of the silver coating 30 is not critical and is preferably in the range of something less than approximately 100 angstroms. To improve the bonding between silver coating 30 and the halves 25 and 26, a high adhesion coating 40, preferably of chromium, is applied onto the tube prior to the application of the silver coating. With the silver coating 30 bonded to the metal tube 20, a thin film dielectric coating 50 is applied.

As above stated in general terms, the present invention features a dielectric overcoat of a thickness of about one-eighth a wavelength, that is, about one half of the quarter wave standard. In greater specifics, the dielectric overcoat of the present invention is to be $0.5 \pm 0.2\ \lambda_m/4$, where $\lambda_m$ is the wavelength of the light in the medium at the 80° angle of incidence. More precisely, $$\lambda_m = \frac{\lambda}{n} \frac{1}{\sqrt{1 - \frac{\sin^2 80°}{n^2}}}$$

where $\lambda$ is the wavelength of the same light in a vacuum and n is the index of refraction.

In the embodiment illustrated in FIG. 4, the thin film dielectric coating is a single layer 50 such as $ThF_4$ or ZnSe. The coating thickness of the thin film dielectric is critical to performance. With single layer coatings, best results are realized with a thickness of about 50% of the $\frac{1}{4}\mu$ thickness. Thus, for a silver guide coated with ZnSe, the optimum thickness of the coating is about $0.7\mu$ and for the silver guide coated with $ThF_4$, the optimum thickness is about $1.4\mu$.

The losses obtained for a variety of dielectric coatings are influenced by the thickness of the coating as well as by N, the complex index of refraction of the material. N is given by $n + ik$, where the extinction coefficient k is the imaginary part, related to the absorption properties of the material. The real part, n, commonly referred to simply as the index of refraction, is the ratio of the speed (or wavelength) of light in a vacuum to the speed (or wavelength) of light in the material. While certain materials exhibit unacceptably high losses regardless of thickness, the optimum thickness of acceptable materials, such as ZnSe and $ThF_4$, is consistently in the range of about 0.5 to the quarter wave thickness. Losses are lower as the imaginary component, k, of the refractive index is minimized. It is crucial to the performance (i.e. transmission) of the waveguide to keep the value of k to some low number. Even though k is related to the properties of the material, to a significant degree the magnitude of k is quality controllable through proper vacuum deposition techniques.

As the value of k decreases, the greater the tolerance allowed on the coating thickness. For example, with a $ThF_4$ layer with a $k=0$, thickness in the range from about $0.6\mu$ to about $2.3\mu$ (or alternatively 0.2 to 0.8 $\lambda_m/2$) will yield an average reflectivity of P and S combined greater than 99% from 80° to 90°. On the other hand, with $k=2\times 10^{-3}$, the thickness may only be from about 0.4 to 0.6 $\lambda_m/2$ to still yield the same minimum limit on reflectivity. Tables 1 through 3 illustrate this comparison in detail.

TABLE 1

Loss of Silver coated with $ThF_4$ with loss-less ($k = 0$) $ThF_4$.

| Angle | T = .58μ | | T = 1.16μ | | T - 1.67μ | | T = 2.23μ | | T - 2.79μ | |
|---|---|---|---|---|---|---|---|---|---|---|
| | Loss P | Loss S | Loss P | Loss S | Loss P | Loss S | Loss P | Loss S | Loss P | Loss S |
| 80 | 1.76 | .14 | .77 | .18 | .54 | .32 | .50 | .84 | .50 | 3.18 |
| 83 | 1.57 | .09 | .58 | .13 | .39 | .22 | .35 | .62 | .35 | 4.00 |
| 86 | 1.08 | .05 | .35 | .07 | .23 | .13 | .20 | .37 | .20 | 4.66 |
| 89 | .30 | .01 | .09 | .02 | .06 | .03 | .05 | .09 | .05 | 2.23 |

TABLE 2

Loss of Silver coated with $ThF_4$ of varying thickness, with $k = 2 \times 10^{-3}$.

| Angle | T = .6μ | | T = 1.2μ | | T — 1.8μ | | T = 2.4μ | |
|---|---|---|---|---|---|---|---|---|
| | Loss P | Loss S | Loss P | Loss S | Loss P | Loss S | Loss P | Loss S |
| 81 | 2.79 | .13 | 1.55 | .24 | 1.12 | .72 | 1.01 | 3.86 |
| 83 | 2.64 | .10 | 1.30 | .19 | .91 | .56 | .80 | 3.28 |
| 85 | 2.25 | .07 | .99 | .13 | .67 | .41 | .58 | 2.52 |
| 87 | 1.56 | .04 | .62 | .08 | .41 | .25 | .35 | 1.60 |
| 89 | .56 | .01 | .21 | .03 | .14 | .08 | .12 | .55 |

TABLE 3

Loss of Silver coated with $ThF_4$ of varying thickness, with $k = 10^{-3}$.

| Angle | T = .6μ | | T = 1.2μ | | T — 1.8μ | | T = 2.4μ | |
|---|---|---|---|---|---|---|---|---|
| | Loss P | Loss S | Loss P | Loss S | Loss P | Loss S | Loss P | Loss S |
| 81 | 2.46 | .13 | 1.26 | .21 | .86 | .53 | .73 | 2.57 |
| 83 | 2.32 | .10 | 1.05 | .16 | .69 | .49 | .58 | 2.18 |
| 85 | 1.98 | .07 | .80 | .12 | .51 | .30 | .42 | 1.68 |
| 87 | 1.37 | .04 | .50 | .07 | .31 | .18 | .26 | 1.06 |
| 89 | .49 | .01 | .17 | .02 | .10 | .06 | .09 | .36 |

Similar dependence of allowable coating thickness on k value can be found with ZnSe as illustrated in Tables 4 and 5.

TABLE 4

Reflection loss of $A_g$ coated with ZnSe of varying thickness in which $k = 10^{-3}$.

| Angle | T = .1μ | | T = .4μ | | T — .7μ | | T = 1.0μ | |
|---|---|---|---|---|---|---|---|---|
| | Loss P | Loss S | Loss P | Loss S | Loss P | Loss S | Loss P | Loss S |
| 81 | 3.99 | .11 | 1.98 | .16 | 1.16 | .34 | .92 | 2.08 |
| 83 | 4.68 | .09 | 1.76 | .12 | .93 | .26 | .72 | 1.66 |
| 85 | 5.43 | .06 | 1.41 | .09 | .69 | .19 | .52 | 1.21 |
| 87 | 5.62 | .04 | .92 | .05 | .42 | .11 | .31 | .74 |
| 89 | 2.98 | .01 | .32 | .02 | .12 | .06 | .10 | .25 |

TABLE 5

Reflection loss of $A_g$ coated with ZnSe of varying thickness, in which $k = 10^{-3}$.

| Angle | T = .1μ | | T = .4μ | | T — .7μ | | T = 1.0μ | |
|---|---|---|---|---|---|---|---|---|
| | Loss P | Loss S | Loss P | Loss S | Loss P | Loss S | Loss P | Loss S |
| 81 | 3.97 | .11 | 1.93 | .15 | 1.09 | .32 | .82 | 1.88 |
| 85 | 5.40 | .06 | 1.37 | .09 | .65 | .18 | .46 | 1.06 |
| 89 | 2.97 | .01 | .31 | .02 | .13 | .04 | .09 | .22 |

Even with $k=0$, for high refractive indices, unacceptably high reflectivity losses occur. Germanium, for example, even with $k=0$ never yields a low loss reflectivity condition as can be seen in Table 6.

TABLE 6

Reflection loss of $A_g$ coated with Ge and varying thicknesses in which k = 0.0

| Angle | T = .1μ Loss P | Loss S | T = .3μ Loss P | Loss S | T = .5μ Loss P | Loss S | T = .7μ Loss P | Loss S |
|---|---|---|---|---|---|---|---|---|
| 81 | 4.04 | .12 | 2.75 | .20 | 2.31 | .35 | 1.90 | 11.07 |
| 83 | 4.65 | .09 | 2.46 | .16 | 1.63 | .66 | 1.48 | 9.42 |
| 85 | 5.23 | .07 | 1.99 | .11 | 1.19 | .47 | 1.07 | 7.26 |
| 87 | 5.11 | .04 | 1.31 | .07 | .73 | .28 | .64 | 4.63 |
| 89 | 2.52 | .01 | .46 | .02 | .24 | .09 | .21 | 1.60 |

Regardless of choice of dielectric coating materials, the preferred geometry of the metal guide 10 is square shaped as shown in FIG. 3 and an alternation approach is shown in FIG. 5. In FIG. 3 respective halves have V-shaped grooves formed therein, and the square guide results when the opposing portions are joined. The square shape is particularly advantageous for ease of fabrication. In FIG. 5, two essentially V-shaped portions 20a and 20b may be separately coated and subsequently combined to form the guide 20. When V-shaped sections 20a and 20b are placed in a vacuum chamber, resting on their respective pointed ends 21 with their interior surface that is to be coated facing a source of thin film dielectric, a relatively equal thickness coating by the well-known vacuum deposition technique is achievable. A generally circular cross sectional guide such as shown in FIG. 6 may also be fabricated by joining semicircular sections 20'a and 20'b. However, the circular interior surface of sections 20'a and 20'b require that they may be oscillated during the vacuum deposition step in order to ensure a relatively uniform thickness of the dielectric coatings.

After fabrication, the waveguide 20 is preferably inserted into a plastic or metal sleeve 60 for safety consideration should the guide ever crack during use. To enhance the ease with which metal guide 20 is encased in a plastic sleeve 60, the metal guide 20, as shown in FIG. 5, has a planar interior surface but has a circular exterior.

I claim:

1. A narrow diameter, flexible, hollow waveguide for high efficiency transmission of laser light by internal reflection, said waveguide comprising:
   (a) a hollow flexible elongated housing;
   (b) a highly reflective coating on the internal surface of said guide; and
   (c) a thin film dielectric coating overlying said reflective coating, said thin film having an index of refractivity n of about 2.6 or less and a thickness in the range of 0.075 to 0.175 of the wavelength of the laser light in the medium of the dielectric, whereby the average of the reflectivity of the P polarization of the laser light and the reflectivity of the S polarization is greater than 99.0% for any incident angle in the range of 80° to 90°.

2. The hollow waveguide according to claim 1 wherein said metal coating is selected from the group consisting of silver, gold, and aluminum.

3. The hollow waveguide according to claim 1 wherein said dielectric coating is selected from the group consisting of $ThF_4$ and ZnSe.

4. The hollow waveguide according to claim 1 wherein the internal surfaces of said housing are planar and the internal cross section of said housing is rectangular.

5. The hollow waveguide according to claim 1 further comprising a coating applied intermediate said housing and said reflective coating to provide enhanced adherence of said reflective coating to said guide.

* * * * *